United States Patent
Liu et al.

(10) Patent No.: US 10,891,177 B2
(45) Date of Patent: Jan. 12, 2021

(54) MESSAGE MANAGEMENT METHOD AND DEVICE, AND STORAGE MEDIUM

(71) Applicant: Tencent Technology (Shenzhen) Company Limited, Shenzhen (CN)

(72) Inventors: Xin Liu, Shenzhen (CN); Min Wang, Shenzhen (CN); Bo Pang, Shenzhen (CN); Dekai Li, Shenzhen (CN); Li Pan, Shenzhen (CN); Haojie Lin, Shenzhen (CN); Yudong Chen, Shenzhen (CN); Yikun Huang, Shenzhen (CN); Junliang Zeng, Shenzhen (CN); Peiyi Chen, Shenzhen (CN); Li Li, Shenzhen (CN); Jindong Zhang, Shenzhen (CN); Rongjian Huang, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/869,400

(22) Filed: May 7, 2020

(65) Prior Publication Data
US 2020/0264942 A1      Aug. 20, 2020

Related U.S. Application Data

(63) Continuation of application No. PCT/CN2018/116249, filed on Nov. 19, 2018.

(30) Foreign Application Priority Data

Dec. 25, 2017   (CN) .......................... 2017 1 1425268

(51) Int. Cl.
*G06F 9/54*       (2006.01)
*G06F 9/48*       (2006.01)

(52) U.S. Cl.
CPC ............ *G06F 9/546* (2013.01); *G06F 9/4881* (2013.01)

(58) Field of Classification Search
CPC ...................................................... G06F 9/546
(Continued)

(56) References Cited

U.S. PATENT DOCUMENTS 7,272,658 B1 * 9/2007 Edelman ................. H04L 47/10
                                                                       709/231
8,050,284 B2 * 11/2011 Zhao ....................... H04L 47/30
                                                                       370/412

(Continued)

FOREIGN PATENT DOCUMENTS

| CN | 101159711 A | 4/2008 |
| CN | 105763481 A | 7/2016 |
| CN | 108200134 A | 6/2018 |

OTHER PUBLICATIONS

Tencent Technology, ISR, PCT/CN2018/116249, dated Feb. 3, 2019, 2 pgs.

(Continued)

*Primary Examiner* — Andy Ho
(74) *Attorney, Agent, or Firm* — Morgan, Lewis & Bockius LLP (57) ABSTRACT

A message management method is performed at a computing device, the method including: storing received messages into a plurality of cache queues according to priorities of the received messages; extracting messages from the plurality of cache queues, and storing the extracted messages into a uniform cache queue, wherein the uniform cache queue includes multiple entries, each entry corresponding to a respective one of the plurality of cache queues; scheduling the stored messages in the uniform cache queue to a plurality of outputting scheduling queues according to their respective priorities; and transmitting the stored messages from the (Continued)

scheduling queues to respective terminals by using a transmit channel corresponding to the scheduling queues.

20 Claims, 5 Drawing Sheets

(58) Field of Classification Search
USPC .................................................. 719/313, 314
See application file for complete search history.

(56) References Cited

U.S. PATENT DOCUMENTS

| | | | |
|---|---|---|---|
| 8,117,396 B1* | 2/2012 | Fair | H04L 67/1097 |
| | | | 711/133 |
| 8,203,942 B2* | 6/2012 | Hernandez | H04L 47/125 |
| | | | 370/230 |
| 2005/0047425 A1* | 3/2005 | Liu | H04L 47/50 |
| | | | 370/411 |
| 2015/0212794 A1 | 7/2015 | Otenko | |

OTHER PUBLICATIONS

Tencent Technology, WO, PCT/CN2018/116249, dated Feb. 3, 2019, 4 pgs.
Tencent Technology, IPRP, PCT/CN2018/116249, dated Jun. 30, 2020, 5 pgs.

* cited by examiner

MESSAGE MANAGEMENT METHOD AND DEVICE, AND STORAGE MEDIUM

CROSS-REFERENCE TO RELATED APPLICATIONS

This application is a continuation application of PCT Application No. PCT/CN2018/116249, entitled "MESSAGE MANAGEMENT METHOD AND DEVICE, AND STORAGE MEDIUM" filed on Nov. 19, 2018, which claims priority to Chinese Patent Application No. 201711425268.X, entitled "REQUEST MESSAGE MANAGEMENT METHOD AND APPARATUS, AND STORAGE MEDIUM" filed with the Chinese Patent Office on Dec. 25, 2017, all of which are incorporated by reference in its entirety.

FIELD OF THE TECHNOLOGY

This application relates to communications technologies, and in particular, to a message management method and device, and a storage medium.

BACKGROUND OF THE DISCLOSURE

Under a condition of transmission of a large amount of complex information, the complex information transmission mainly faces problems in the following two aspects:
1) Serious congestion phenomenon under a condition of a large amount of information. If a large quantity of requests arrive and the quantity is greater than a size of a buffer of a server, the requests are rejected, and messages are lost. A conventional processing strategy is to ensure, to the greatest extent, that all messages arrive fairly, and even some messages are lost, fairness is ensured to the greatest extent. As a result, limited cache resources are not used by truly urgent messages, and important messages cannot delivered.
2) Relatively high latency of urgent messages. Actually, according to importance, there are different deadlines for messages transmitted by a push system (for example, the deadlines of messages such as the earthquake, the rough weather, and stocks are obviously shorter than the deadlines of game applications and entertainment information). Because the scheduling strategy in the related art emphasizes the fairness between all message streams, the receiving terminal cannot receive these urgent messages in time.

SUMMARY

A message management method and device, and a storage medium are provided according to embodiments of this application.

A message management method, is executed by a computing device, the method comprising:
storing received messages into a plurality of cache queues according to priorities of the received messages;
extracting messages from the plurality of cache queues, and storing the extracted messages into a uniform cache queue, wherein the uniform cache queue includes multiple entries, each entry corresponding to a respective one of the plurality of cache queues;
scheduling the stored messages in the uniform cache queue to a plurality of outputting scheduling queues according to their respective priorities; and
transmitting the stored messages from the scheduling queues to respective terminals by using a transmit channel corresponding to the scheduling queues.

A computing device includes memory and a processor, the memory storing computer-readable instructions, and the computer-readable instructions, when executed by the processor, causing the processor to perform the aforementioned message management method.

A non-transitory computer readable storage medium stores computer-readable instructions, the computer-readable instructions, when executed by one or more processors, causing the one or more processors to perform the aforementioned message management method.

One or more embodiments of this application are provided in the following accompanying drawings and descriptions. Other features, objectives, and advantages of this application may be clearer in the specification, the accompanying drawings, and claims.

BRIEF DESCRIPTION OF THE DRAWINGS

To describe the technical solution in this embodiment of this application more clearly, a brief introduction is made below to accompanying drawings required in descriptions of this embodiment. Obviously, the accompanying drawings described below are merely some embodiments of this application, and for a person skilled in the art, other accompanying drawings may be further obtained according to the accompanying drawings without paying creative efforts.

DESCRIPTION OF EMBODIMENTS

To make the objectives, technical solutions, and advantages of this application clearer and more understandable, this application is further described in detail below with reference to accompanying drawings and embodiments. It is to be understood that the specific embodiments described herein are merely used for explaining this application, and are not used for limiting this application.

Before this application is further described in detail, a description is made on nouns and terms involved in the embodiments of this application, and the nouns and terms involved in the embodiments of this application are applicable to the following explanations.

1) Terminal: including but not limited to a common terminal and a dedicated terminal, where the common terminal maintains a persistent connection and/or a short connection to a transmit channel, and the dedicated terminal maintains a persistent connection to the transmit channel.

2) Urgent message: a judgment is made on received messages, and a message is determined to be an urgent message when a priority of the message is greater than a priority threshold set by a system; and a message is determined to be a non-urgent message when the priority of the message is less that the priority threshold set by the system.

A judgment is made on a source channel of a message, and the message is an urgent message when the message originates from an urgent channel set by a system; alternatively, when the received message carries an urgent message identifier, the system determines that the message is an urgent message.

The latency of an urgent message is higher than the latency of a non-urgent message.

Figure 1:
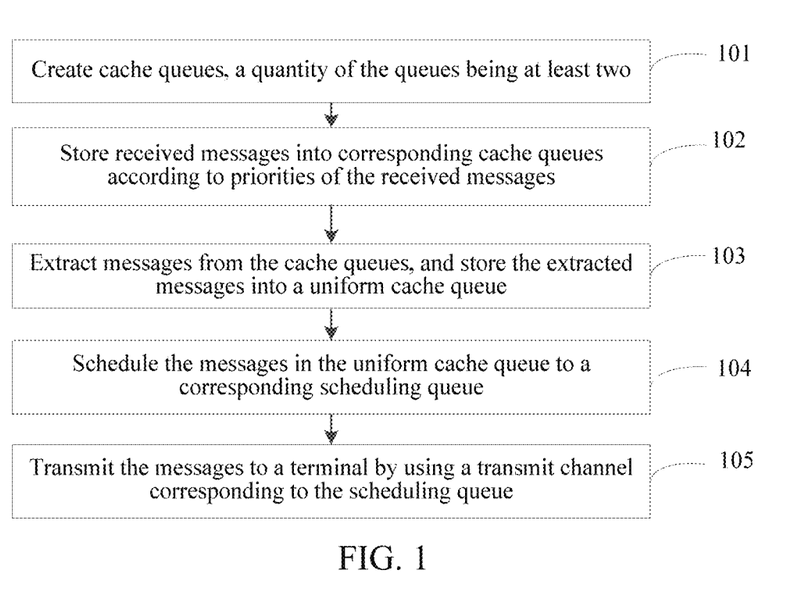
FIG. 1 is a schematic flowchart of a message management method according to an embodiment.

FIG. 1 is a schematic flowchart of a message management method according to an embodiment. As shown in FIG. 1, the message management method includes the following steps:

Step 101: Create cache queues, a quantity of the queues being at least two.

Step 102: Store received messages into corresponding cache queues according to priorities of the received messages.

In an embodiment, the creating cache queues includes creating a fixed quantity of cache queues, the created cache queues being configured to receive and store messages of which the priorities correspond to the cache queues. The quantity of the cache queues is not changed due to the change of a quantity of the received messages. The use environment of this embodiment mainly aims at a system of which the use environment is fixed, and a peak value of the received messages may not change greatly.

In an embodiment, the creating cache queues includes creating a static quantity of cache queues, the static quantity corresponding to a quantity of all priorities involved in initialized messages. When a message management device receives messages, all messages or some messages may be initialized according to the message management method disclosed in this application. In an embodiment, the message management device creates, according to a quantity of priorities involved in messages that are already initialized, cache queues corresponding to the quantity. In an embodiment, a ratio of the quantity of the cache queues to the quantity of priorities involved in messages that are already initialized is 1:1, 1:2, or 2:1.

In an embodiment, the creating a static quantity of cache queues, the static quantity corresponding to a quantity of all priorities involved in initialized messages further includes: creating a static quantity of cache queues according to a running speed and an information processing capability of a hardware device and/or according to an information transmission capability of interfaces and buses of a network environment in which the message management device is located.

In an embodiment, the static quantity corresponding to a quantity of all priorities involved in initialized messages includes: the static quantity and the all priorities being in a positively correlated quantity relationship, and the all priorities involving the priorities involved in the initialized messages.

For example, in an embodiment, when the quantity of the messages that are already initialized is four, two cache queues are created; and in another embodiment, when the quantity of the messages that are already initialized is eight, four or three cache queues are created.

In an embodiment, the creating cache queues includes obtaining priorities involved in the received messages; and creating a dynamic quantity of cache queues according to the priorities involved in the received messages. The received messages include: messages that are already received and transmitted or messages that are already received but not transmitted.

In an embodiment, the creating cache queues according to the priorities involved in the received messages includes: creating cache queues of which a quantity corresponds to that of the involved priorities according to the priorities involved in the received messages. For example, when the quantity of the messages that are already received but not transmitted is four and the quantity of involved priorities is four, the message management device may create four or two cache queues.

In an embodiment, the message management device may create cache queues of which the quantity corresponds to that of the involved priorities according to a fixed ratio. For example, when the quantity of the messages that are already received but not transmitted is four and the quantity of involved priorities is four, the message management device may create two waiting queues according to a ratio of 2:1.

In an embodiment, the creating cache queues according to the priorities involved in the received messages includes: matching the quantity of the priorities involved in the received messages with a priority quantity threshold, and creating a dynamic quantity of cache queues according to a matching result, at least one cache queue configured to store a message with a fixed priority in the messages being included.

When the message management method provided in this application is performed, the hardware device may extract the quantity of messages that are already received and transmitted in a unit time, and perform, according to the quantity, a prejudgment on a quantity of messages to be received in an adjacent unit time, to implement an intelligent setting of a quantity of the cache queues.

The quantity of priorities involved in the messages that are already received and transmitted in a unit time are matched with the priority quantity threshold, and a dynamic quantity of cache queues are created according to a matching result, where the dynamic quantity is associated with the quantity of the priorities involved in the messages that are already received and transmitted in a unit time. At least one cache queue configured to store non-urgent messages in the messages is included, and the priority quantity threshold may be set to different values by a system.

In an embodiment, the priority quantity threshold set by a system is five, if the quantity of the priorities involved in the received messages is six, which is greater than the priority quantity threshold, namely, five, and in this case, a first quantity of cache queues are created; if the quantity of the priorities involved in the received messages is four, which is less than the priority quantity threshold, namely, five, then a second quantity of cache queues are created, where the first quantity is greater than the second quantity.

Step 103: Extract messages from the cache queues, and store the extracted messages into a uniform cache queue.

The extracting messages from the cache queues, and storing the extracted message into a uniform cache queue includes: extracting the messages from the cache queues to the uniform cache queue in a polling extraction manner in a case that the messages extracted from the cache queues are all scheduled to a corresponding scheduling queue.

In an embodiment, the message management device may set a valuing unit, configured to extract messages from the cache queues to the uniform cache queue, and when the valuing unit is empty, a traversal search is performed from a top portion of the cache queues; and when there are messages in the cache queues, the messages are extracted from the cache queues to the uniform cache queue by using the valuing unit in a polling extraction manner.

In an embodiment, the extracting messages from the cache queues to a uniform cache queue in a polling extraction manner includes: sorting the priorities of the cache queues in descending order; and extracting messages from the cache queues to the uniform cache queue according to a result of the sorting in descending order through polling extraction. Therefore, it may be ensured that a message with a high priority in the cache queues enters the uniform cache queue preferentially.

In an embodiment, when the received messages carry priority identifiers, the hardware device performing the message management method disclosed in this application may recognize the priority identifiers and perform a specified extraction, to make messages with high priorities enter the uniform cache queue preferentially. Application scenarios in this embodiment include: for a specified terminal, for example, when a terminal device that makes an emergency response to an earthquake needs to transmit messages, when a message with the highest priority representing occurrence of an earthquake is received, the message may be transmitted in a system preferentially.

Step 104: Schedule the messages in the uniform cache queue to a corresponding scheduling queue.

The scheduling the messages in the uniform cache queue to a corresponding scheduling queue includes at least one of the following:

1) distributing a message to a real-time or non-real-time scheduling queue according to a priority identifier of the message in the uniform cache queue;
2) determining a real-time or non-real-time scheduling attribute of the message according to a priority of the message in the uniform cache queue, and scheduling the message to the real-time scheduling queue or the non-real-time scheduling queue according to the scheduling attribute of the message.

In an embodiment, the determining a real-time or non-real-time scheduling attribute of the message according to a priority of the message in the uniform cache queue includes: determining the real-time scheduling attribute of the message in a case that the priority of the message in the uniform cache queue is higher than a priority threshold; and determining the non-real-time scheduling attribute of the message in a case that the priority of the message in the uniform cache queue is not higher than the priority threshold.

According to the message management method disclosed in this embodiment, the hardware device may further perform a specific scheduling by completing a judgment on the priority of the message.

Step 105: Transmit the messages to a terminal by using a transmit channel corresponding to the scheduling queue.

In an embodiment, when a message is received, a priority of the received message may also be first determined. In an embodiment, channel information of the message is obtained by parsing the received message; and the priority of the message is determined based on the channel information.

As an example, the channel information is used for representing a source of the message, for example, a server or an application where the message originates. That the priority of the message is determined based on the channel information may be determining the priority of the message according to a preset channel priority, and for example, for source applications of the message, an application with a high real-time performance is higher than an application with a low real-time performance.

The channel information includes but is not limited to: a source application (APP) of the message and a source terminal of the message.

In an embodiment, when the source APP of the message is in a preset APP trust list, the priority of a message transmitted by an APP in the APP trust list is higher than the priority of a message transmitted by an APP not in the APP trust list.

In an embodiment, when the message carries priority information, at least one of the following is performed based on the priority information carried by the message: merging the priority information carried by the message into the channel information of the message; and inheriting, by the channel information, the priority information carried by the message.

When it is determined that the priority information carried in the message is merged into the channel information of the message, the priority of the message is determined based on the merged channel information.

When it is determined that the channel information inherits the priority information carried by the message, the priority of the message needs to be determined merely based on the channel information.

The transmitting the messages to a terminal by using a transmit channel corresponding to the scheduling queue includes at least one of the following:

transmitting the messages in the scheduling queue by using a reserved channel in a case that the scheduling queue is a real-time scheduling queue, the reserved channel being configured to instantly transmit the messages in the real-time scheduling queue; alternatively, transmitting the messages in the scheduling queue by using a common channel sequentially according to the priorities in a case that the scheduling queue is a non-real-time scheduling queue.

In a specific embodiment, the messages may be specifically request messages. For example, another computer device or another terminal initiates a request message to the message management device.

It is to be understood that, although the steps are displayed sequentially according to the instructions of the arrows in the flowcharts of the embodiments, these steps are not necessarily performed sequentially according to the sequence instructed by the arrows. Unless otherwise specifically described in the specification, there is no strict sequence limitation on the performance of these steps, and these steps may be performed in another sequence. In addition, at least a part of the steps in the foregoing embodiments may include a plurality of substeps or a plurality of stages. These substeps or stages are not necessarily performed and completed at the same time, and may be performed at different times. Besides, these substeps or stages may be not necessarily performed sequentially, and may be performed in turn or alternately with other steps or at least a part of substeps or stages of other steps.

Figure 2:
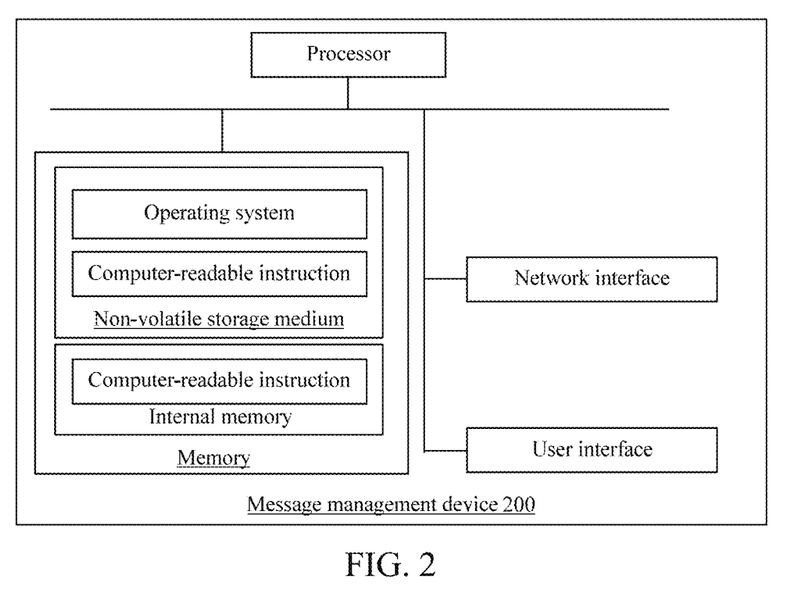
FIG. 2 is a schematic diagram of an internal structure of a message management device according to an embodiment.

FIG. 2 is a schematic diagram of an internal structure of a message management device according to an embodiment. A message management device 200 may be specifically a hardware device including a message processing function such as a mobile phone, a computer, a digital broadcast terminal, a message transceiving device, a game console, a tablet device, a medical device, exercise equipment, or a personal digital assistant. As shown in FIG. 2, the message management device 200 includes: a processor, a memory, a network interface, and a user interface. Components in the message management device 200 may be coupled together by using a bus system. It is to be understood that the bus system is configured to implement connection and communication between these components. In addition to a data bus, the bus system further includes a power supply bus, a control bus, and a status signal bus. However, for the sake of a clear description, the buses in FIG. 2 are all marked as the bus system. A person skilled in the art may understand that, the structure shown in FIG. 2 is merely a block diagram of a part of structure related to the solution of this application, and does not constitute any limitation on a message management device to which the solution of this application is applied. A specific message management device may include more or fewer components than shown in the figure, or combine some components, or include a different layout of components. The user interface may include a display, a keyboard, a mouse, a trackball, a click wheel, a key, a button, a touchpad, or a touchscreen.

The memory includes a non-volatile storage medium and an internal memory. The non-volatile storage medium of the message management device 200 stores an operating system, and may further store computer-readable instructions, the computer-readable instructions, when executed by a processor, causing the processor to implement the message management method. The internal memory may also store computer-readable instructions, and the computer-readable instructions, when executed by a processor, cause the processor to perform the message management method. The non-volatile memory may be a read-only memory (ROM), a programmable ROM (PROM), an erasable PROM (EPROM), an electrically EPROM (EEPROM), a ferromagnetic random access memory (FRAM), a flash memory, a magnetic surface memory, a compact disc, or a compact disc ROM (CD-ROM); and the magnetic surface memory may be a magnetic disc memory or a magnetic tape memory. The volatile memory may be a random access memory (RAM), and is used as an external cache. Through exemplary but not limitative description, many forms of RAMs may be used, for example, a static RAM (SRAM), a synchronous SRAM (SSRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). The memory described in this embodiment of this application aims to include these memories and any other suitable type of memories.

The memory in this embodiment of this application includes but is not limited to: a ternary content addressable memory and an SRAM that can store message data to support the operations of the message management device 200. Examples of the data include: any computer-readable instruction used for operation on the message management device 200, such as an operating system, a caching module, and a scheduling module; and various types of messages. The operating system includes various system programs, such as framework layers, kernel library layers, and driver layers used for implementing various basic business and processing hardware-based tasks. The caching module and the scheduling module may include various application programs, such as clients or application programs including a message management function, which are used for implementing various application services such as storing and forwarding performed on the received messages. The computer-readable instructions implementing the message management method in this embodiment of this application may be included in the caching module and the scheduling module.

The method disclosed in the foregoing embodiment of this application may be performed by the message management device shown in FIG. 2 by using a processor. The processor may be an integrated circuit chip, and has a signal processing capability. During implementation, the steps of the foregoing method may be implemented by using a hardware integrated logic circuit in the processor or implemented by using an operation in a software form. The foregoing processor may be a general-purpose processor, a digital signal processor (DSP), or another programmable logical device, discrete gate or transistor logical device, or discrete hardware component. The processor may implement or perform methods, steps and logical block diagrams provided in the embodiments of this application. The general-purpose processor may be a microprocessor or any conventional processor and the like. Steps of the methods provided with reference to the embodiments of this application may be directly executed and completed by means of a hardware decoding processor, or may be executed and completed by using a combination of hardware and software modules in the decoding processor. The software module may be located in the storage medium, and the processor extracts information in the storage medium and completes the steps in the foregoing method in combination with hardware of the processor.

In an embodiment, the message management device 200 may be implemented by one or more application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic components, to implement the message management method.

An embodiment of this application further provides a computer-readable storage medium, for example, a memory including executable instructions, and the foregoing executable instructions may be executed by the processor of the message management device 200, to implement the steps of the foregoing method. The computer-readable storage medium may be a memory such as an FRAM, a ROM, a PROM, an EPROM, an EEPROM, a flash memory, a magnetic surface memory, a compact disc, or a CD-ROM; or may be any device including one of or any combination of the foregoing memories, such as a mobile phone, a computer, a tablet device, or a personal digital assistant.

An embodiment of this application further provides a computer-readable storage medium, storing computer-readable instructions, the computer-readable instructions, when executed by one or more processors, causing the one or more processors to perform the following operations: creating cache queues, a quantity of the queues being at least two; storing received messages into corresponding cache queues according to priorities of the received messages; extracting messages from the cache queues, and storing the extracted messages into a uniform cache queue; scheduling the messages in the uniform cache queue to a corresponding scheduling queue; and transmitting the messages to a terminal by using a transmit channel corresponding to the scheduling queue.

Figure 3:
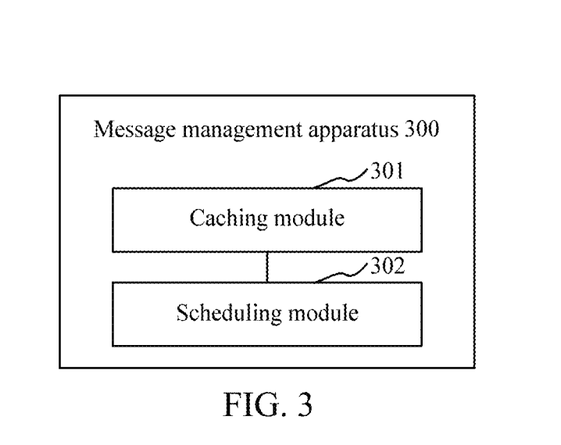
FIG. 3 is a schematic diagram of a module structure of a message management apparatus according to an embodiment.

As shown in FIG. 3, in an embodiment, a message management apparatus 300 is provided. Referring to FIG. 3, the message management apparatus 300 includes: a caching module 301 and a scheduling module 302. All or some of the modules included in the message management apparatus 300 may be implemented by software, hardware, or a combination thereof.

The caching module 301 is configured to create cache queues, a quantity of the queues being at least two; and store received messages into corresponding cache queues according to priorities of the received messages.

The scheduling module 302 is configured to extract messages from the cache queues; store the extracted messages into a uniform cache queue; schedule the messages in the uniform cache queue to a corresponding scheduling queue; and transmit the messages to a terminal by using a transmit channel corresponding to the scheduling queue.

In an embodiment, the caching module 301 is further configured to create a fixed quantity of cache queues, the created cache queues being configured to store messages of which the priorities correspond to the cache queues. The quantity of the cache queues is not changed due to the change of the quantity of the received messages. The use environment of this embodiment mainly aims at a system of which the use environment is fixed, and a peak value of the received messages may not change greatly.

In an embodiment, the caching module 301 is further configured to create a static quantity of cache queues, the static quantity corresponding to a quantity of all priorities involved in initialized messages.

In an embodiment, the caching module 301 is further configured to create cache queues in a positively correlated quantity relationship with all priorities, the all priorities involving the priorities involved in the initialized messages.

When messages are received, all messages or some messages may be initialized according to the message management method disclosed in this application. In an embodiment, according to a quantity of priorities involved in messages that are already initialized, cache queues corresponding to the quantity are created. In an embodiment, a ratio of the quantity of the cache queues to the quantity of priorities involved in messages that are already initialized is 1:1, 1:2, or 2:1.

In an embodiment, creating cache queues corresponding to the quantity of all priorities of the initialized messages includes: creating cache queues in a positive correlation with the quantity of all priorities of the initialized messages.

For example, in an embodiment, when the quantity of the messages that are already initialized is four, two cache queues are created; and in another embodiment, when the quantity of the messages that are already initialized is eight, four or three cache queues are created.

In an embodiment, the caching module 301 is further configured to obtain priorities involved in the received messages; and create a dynamic quantity of cache queues according to the priorities involved in the received messages.

Cache queues of which a quantity corresponds to that of the involved priorities are created according to the priorities involved in the received messages. In an embodiment, when the quantity of the messages that are already received but not transmitted is four and the quantity of involved priorities is four, optionally, four or two cache queues are created.

In an embodiment, the caching module 301 is further configured to create cache queues of which a quantity corresponds to that of the involved priorities according to the priorities involved in the received messages.

In an embodiment, the caching module 301 is further configured to match the quantity of the priorities involved in the received messages with a priority quantity threshold; and create a dynamic quantity of cache queues according to a matching result, at least one cache queue configured to store a message with a fixed priority in the messages being included.

When the message management method provided in this application is performed, a hardware device may extract the quantity of messages that are already received and transmitted in a unit time, and perform, based on the quantity, a prejudgment on a quantity of messages to be received in an adjacent unit time, to implement an intelligent setting of a quantity of the cache queues.

The quantity of priorities involved in the messages that are already received and transmitted in a unit time is matched with the priority quantity threshold, and a dynamic quantity of cache queues are created according to a matching result, where the dynamic quantity is associated with the quantity of the priorities involved in the messages that are already received and transmitted in a unit time. At least one cache queue configured to store non-urgent messages in the messages is included, and the priority quantity threshold may be set to different values by a system.

In an embodiment, the caching module 301 is further configured to create a first quantity of cache queues in a case that the quantity of the priorities involved in the messages is greater than or equal to the priority quantity threshold; and create a second quantity of cache queues in a case that the quantity of the priorities involved in the messages is less than the priority quantity threshold.

For example, the priority quantity threshold set by a system is five, if the quantity of the priorities involved in the received messages is six, which is greater than the priority quantity threshold, namely, five, and in this case, a first quantity of cache queues are created; if the quantity of the priorities involved in the received messages is four, which is less than the priority quantity threshold, namely, five, then a second quantity of cache queue are created, where the first quantity is greater than the second quantity.

In an embodiment, the caching module 301 is further configured to store received messages into corresponding cache queues according to the priorities of the received messages; and extract messages from the cache queues to a uniform cache queue in a polling extraction manner.

In an embodiment, a valuing unit may be set, configured to extract messages from the cache queues to the uniform cache queue, and when the valuing unit is empty, a traversal search is performed from a top portion of the cache queues; and when there are messages in the cache queues, the messages are extracted from the cache queues to the uniform cache queue by using the valuing unit in a polling extraction manner.

In an embodiment, the caching module 301 is further configured to sort the priorities of the cache queues in descending order; and extract, according to a result of the sorting in descending order, the messages from the cache queues to the uniform cache queue through polling extraction.

In an embodiment, the scheduling module 302 is further configured to distribute a message to a real-time or non-real-time scheduling queue according to a priority identifier of the message in the uniform cache queue; and the scheduling module 302 is further configured to determine a real-time or non-real-time scheduling attribute of the message according to a priority of the message in the uniform cache queue, and the scheduling module 302 is further configured to schedule the message to the real-time scheduling queue or the non-real-time scheduling queue according to the scheduling attribute of the message.

Messages are extracted, according to a result of the sorting in descending order, from the cache queues to the uniform cache queue through polling extraction. Therefore, it may be ensured that a message with a high priority in the cache queues enters the uniform cache queue preferentially.

In an embodiment, the scheduling module 302 is further configured to determine the real-time scheduling attribute of the message in a case that the priority of the message in the uniform cache queue is higher than a priority threshold; and determine the non-real-time scheduling attribute of the message in a case that the priority of the message in the uniform cache queue is not higher than the priority threshold.

The scheduling module 302 is further configured to schedule the messages in the uniform cache queue to a corresponding scheduling queue; and transmit the messages to a terminal by using a transmit channel corresponding to the scheduling queue.

When the received messages carry priority identifiers, the hardware device performing the message management method disclosed in this application may recognize the priority identifiers and perform a specified extraction, to make messages with high priorities enter the uniform cache queue preferentially. Application scenarios in this embodiment include: for a specified terminal, for example, when a terminal device that makes an emergency response to an earthquake needs to transmit messages, when a message with the highest priority representing occurrence of an earthquake is received, the message may be transmitted in a system preferentially.

In an embodiment, the caching module 301 is further configured to parse the received message, to obtain channel information of the message. That the priority of the message is determined based on the channel information may be determining the priority of the message according to a preset channel priority, and for example, for source applications of the message, an application with a high real-time performance is higher than an application with a low real-time performance. The caching module 301 is further configured to determine the priority of the message based on the channel information.

In an embodiment, when the message carries priority information, the caching module 301 is further configured to merge the priority information carried by the message into the channel information of the message; and determine the priority of the message based on merged channel information when it is determined that the priority information carried by the message is merged into the channel information of the message.

When it is determined that the channel information inherits the priority information carried by the message, the priority of the message needs to be determined merely based on the channel information.

In an embodiment, the scheduling module 302 is further configured to transmit the messages in the scheduling queue by using a reserved channel in a case that the scheduling queue is a real-time scheduling queue, the reserved channel being configured to instantly transmit the messages in the real-time scheduling queue; and transmit the messages in the scheduling queue by using a common channel sequentially according to the priorities in a case that the scheduling queue is a non-real-time scheduling queue.

In an embodiment, the message management apparatus 300 provided in this application may be implemented as a form of computer-readable instructions, and the computer-readable instructions may be run on the message management device 200 shown in FIG. 2. The memory of the message management device 200 may store instruction modules forming the message management apparatus 300, and for example, the caching module 301 and the scheduling module 302 shown in FIG. 3. The computer-readable instructions stored in the instruction modules cause the processor to perform steps of the message management method in the embodiments of this application.

Figure 4:
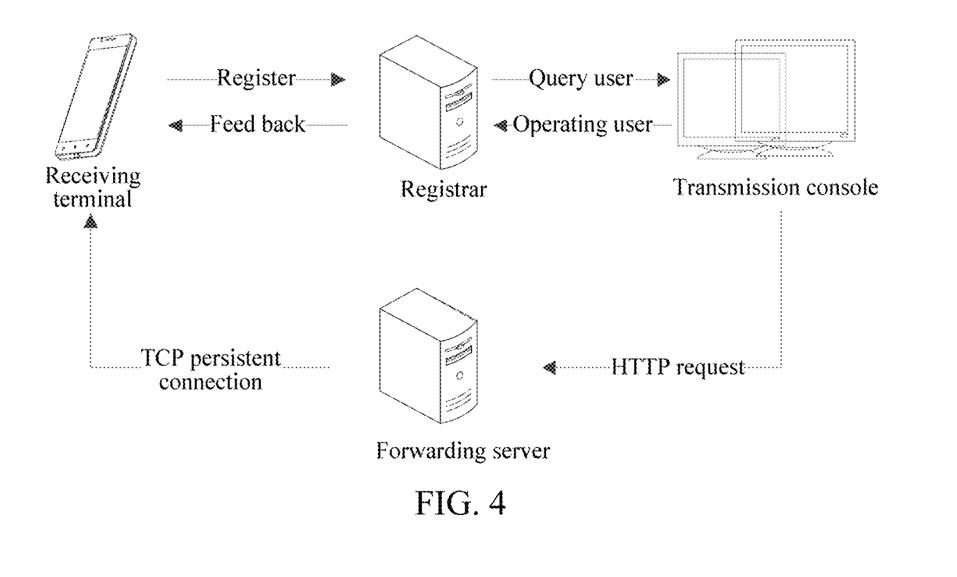
FIG. 4 is a schematic flowchart of an application environment of the message management method according to an embodiment.

FIG. 4 is a schematic diagram of an application environment of the message management method according to an embodiment. As shown in FIG. 4, a transmission console is a login platform of an administrator, and is presented in a form of a webpage or a software development kit (SDK) developed by a specific language. Through the transmission console, the user may implement message transmission in an HTTP request manner, to query information of registered users and perform operations on the users. A registrar is configured to store registration information of terminal users, to facilitate to classify the users. A forwarding server is responsible for storage and forwarding of message bodies; and a receiving terminal may be various types of mobile connected devices, which may be connected to the forwarding server in a transmission control protocol (TCP) persistent connection manner, to receive push information based on a message service process of a resident internal memory, and may also be connected to the forwarding server in a TCP short connection manner. When the terminal is a dedicated terminal, the terminal is connected to the forwarding server only in the TCP persistent connection manner.

Figure 5:
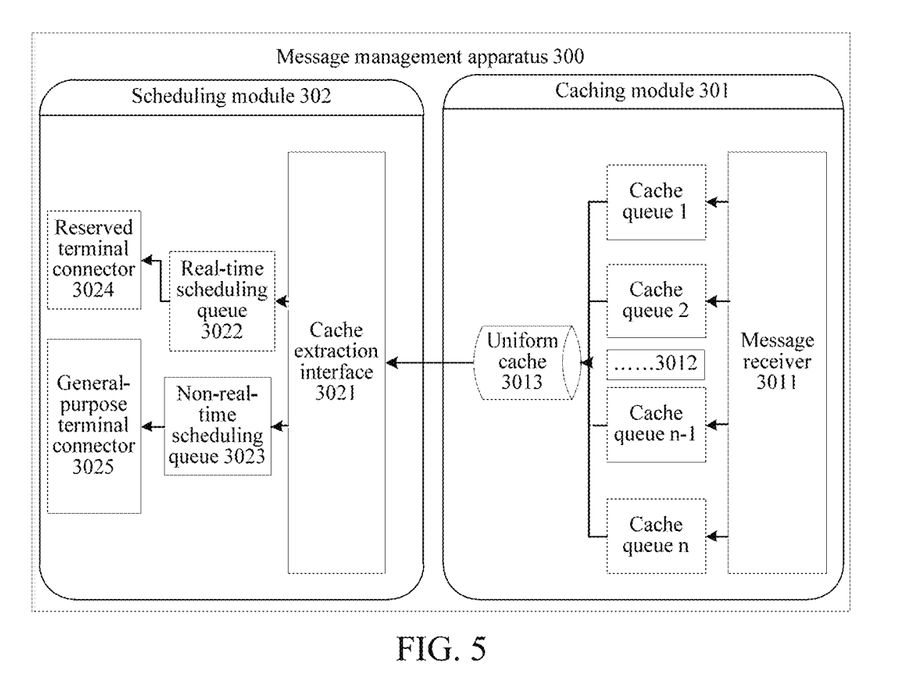
FIG. 5 is a schematic diagram of a module structure of a message management apparatus according to another embodiment.

As shown in FIG. 5, in an embodiment, the caching module 301 includes: a message receiver 3011, a cache queue 3012, and a uniform cache 3013. The scheduling module 302 includes: a cache extraction interface 3021, a real-time scheduling queue 3022, a non-real-time scheduling queue 3023, a reserved terminal connector 3024, and a general-purpose terminal connector 3025.

In an embodiment, the cache queue 3012 is first created, where there are four cache queues 3012.

When the message receiver 3011 receives earthquake information, a QQ login authentication request, stock market information, and game application information, the information is respectively stored into corresponding four cache queues according to different priorities corresponding to the information, where the priorities of the received earthquake information, QQ login authentication request, stock market information, and game application information are sequentially decreased.

In an embodiment, when there are three cache queues 3012, and the message receivers 3011 receives the earthquake information, the QQ login authentication request, the stock market information, and the game application information, the priorities of the received earthquake information, QQ login authentication request, stock market information, and game application information are sequentially decreased. Therefore, the earthquake information enters the first cache queue, the QQ login authentication request and the stock market information enter the second cache queue, and the game application information enters the third cache queue. In this way, a higher priority of the message indicates more cache queues that the message occupies.

The uniform cache 3013 extracts messages from the cache queue 3012, and the uniform cache 3013 is implemented by a database of a Key-Value type, where each cache queue 3012 corresponds to one Key location of the uniform cache 3013. When the cache queue 3012 detects that a Value corresponding to a Key value of the uniform cache 3013 is empty, header elements are written in the corresponding Value.

When the cache extraction interface 3021 extracts messages from the uniform cache 3013 by using a polling extraction mechanism, for messages, opportunities of being extracted are equal; however, a message with a high priority occupies more Key locations, and an opportunity that is of being extracted and that is of the message is increased in equal proportion. The cache extraction interface 3021 reads the probability of the message with a high priority by one extraction, $$P = \frac{m}{n}$$

where n represents a total quantity of the cache queues, and m represents the quantity of cache queues allocated to messages with high priorities in the cache queues. When P is relatively large, it indicates that more transmission channels are allocated to messages with high priorities, and the messages with high priorities may be pushed to the scheduling module without waiting for too long.

Compared with the processing manner in the related art that emphasizes to receive and forward messages fairly according to a sequence of receiving time, by using the message management method disclosed in this application, the received messages can be stored to corresponding cache queues according to the priorities of the received messages. In this way, delay of urgent messages due to that received messages can only be forwarded according to a sequence of receiving time by using the related art is avoided.

Figure 6:
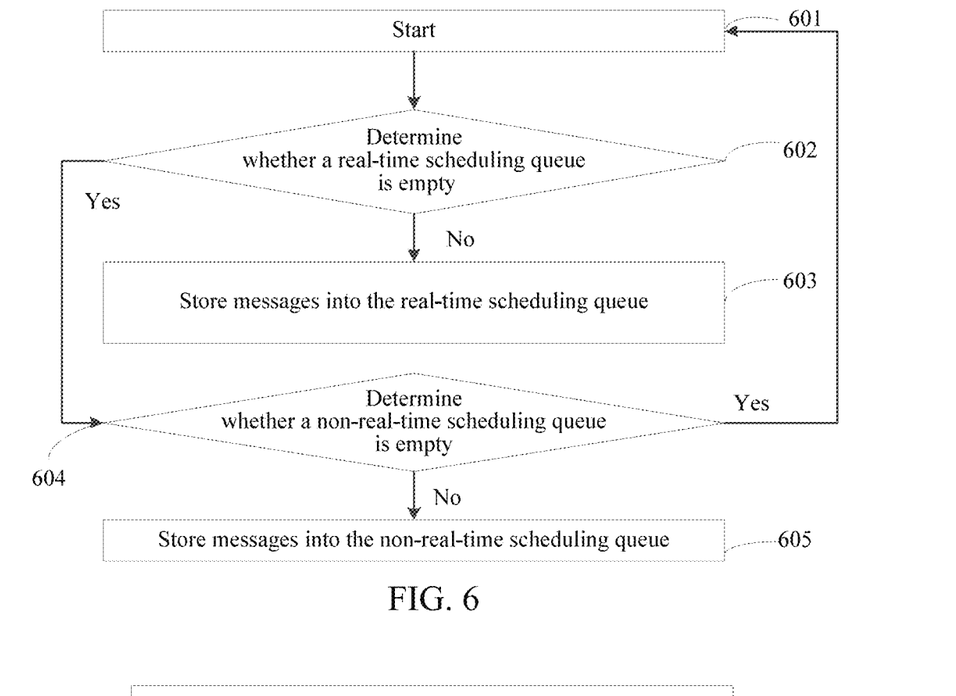
FIG. 6 is a flowchart of a message extraction process in use of the message management method according to an embodiment.

FIG. 6 is a flowchart of a message extraction process in use of the message management method according to an embodiment. As shown in FIG. 6, after the cache extraction interface 3021 completes the message extraction from the uniform cache 3021 by using a polling extraction mechanism, the cache extraction interface 3021 stores the extracted messages to the real-time scheduling queue 3022 or the non-real-time schedule queue 3023, and the following steps are included:

Step 601: Start.

Step 602: Determine whether a real-time scheduling queue is empty, if yes, perform step 404, otherwise, perform step 603.

Step 603: Store messages into the real-time scheduling queue.

Step 604: Determine whether a non-real-time scheduling queue is empty, if yes, perform step 601, otherwise, perform step 605.

Step 605: Store messages into the non-real-time scheduling queue.

Through the message extraction process disclosed in FIG. 6, the real-time scheduling queue may store messages with high priorities, and the non-real-time scheduling queue may store messages according to a descending order of the priorities, or may store messages according to a sequence of the receiving time of the messages.

In this embodiment, among the received earthquake information, QQ login authentication request, stock market information, and game application information, the cache extraction interface 3021 stores the extracted earthquake information into the real-time scheduling queue 3022, and stores the QQ login authentication request, the stock market information, and the game application information into the non-real-time scheduling queue 3023 sequentially according to a descending order of the priorities. In an embodiment of this application, the real-time scheduling queue 3022 and the non-real-time scheduling queue 3023 may be uniformly represented as scheduling queues.

In this embodiment, when the messages extracted by the cache extraction interface 3021 from the uniform cache 3013 are urgent messages, the messages directly enter the real-time scheduling queue, and then are extracted and transmitted by a reserved terminal connector 3024 specifically reserved for the real-time scheduling queue; and when the messages read by the cache extraction interface from the uniform cache 3013 are non-urgent messages, in this case, the system extracts and transmits the messages one by one through the general-purpose terminal connector 3025 according to a descending order of the priorities.

If at a moment, there are A messages waiting to be scheduled in the real-time scheduling queue, and there are B messages waiting to be scheduled in the non-real-time scheduling queue, a result of the scheduling is that A is directly decreased to 0, B is gradually decreased, and A needs to be ensured to be 0 each time. In a case that the waiting of connecting to a terminal is not considered, a worst latency of urgent messages is:

$$T = \sum_{i=1}^{A} t_i c_i$$

A worst latency of common messages is:

$$T = \sum_{i=1}^{A} t_i c_i + \sum_{j=1}^{B} t_j c_j$$

where, $t_i$ and $c_i$ are respectively a transmitting time of the $i^{th}$ urgent message in each terminal and a quantity of terminals that need to transmit the $i^{th}$ message, and $t_j$ and $c_j$ are respectively a transmitting time of the $j^{th}$ common message in each terminal and a quantity of terminals that need to transmit the $i^{th}$ message.

In an embodiment, for example, in the application environment shown in FIG. 4, the transmission console implements a request service in a Shell script manner. A Nginx server is used as a request receiver, and the uniform cache uses a Redis database. When a message transmission solution that an urgent message ratio is 10% is used, five cache queues are set, and two of the cache queues are allocated to the urgent messages with high priorities. Then, received message are stored into corresponding cache queues according to priorities of the received messages; messages are extracted from the cache queues, and the extracted messages are stored into a uniform cache queue; and the messages in the uniform cache queue are scheduled to a corresponding scheduling queue. In a process of transmitting requests to a terminal by using the transmitting channel corresponding to the scheduling queue, 1000 messages are transmitted by each transmitting terminal, and the message are transmitted at intervals of 20 ms. Under a condition that these messages are received by the same terminal device, indicators of the quantity of arrived messages when the messages are transmitted by one transmitting terminal, transmitted by two transmitting terminals simultaneously, and transmitted by three transmitting terminals simultaneously are shown in Table 1:

TABLE 1

| Test occasion | Quantity of transmitting terminals 1 | Quantity of transmitting terminals 2 | Quantity of transmitting terminals 3 |
|---|---|---|---|
| Cache | 1000 | 1604 | 1863 |
| Existing technical condition | 100% | 80.2% | 62.1% |
| Cache | 1000 | 2000 | 2497 |
| Message management method in this application | 100% | 100% | 83.2% |

It may be seen from Table 1 that, by using the message management method disclosed in this application, when messages are transmitted by a plurality of transmitting terminals simultaneously at intervals of 20 ms, an arrival rate of the messages may be effectively improved, and the loss of the messages in the receiving and transmitting process is reduced.

Under a condition that 1000 messages are transmitted by each transmitting terminal, the messages are transmitted at intervals of 10 ms, and the messages are received by the same terminal device, an indicator of the quantity of arrived messages is tested when the messages are transmitted by one transmitting terminal, or transmitted by two transmitting terminals simultaneously, or transmitted by three transmitting terminals simultaneously, and referring to Table 2:

TABLE 2

| Test occasion | Quantity of transmitting terminals 1 | Quantity of transmitting terminals 2 | Quantity of transmitting terminals 3 |
|---|---|---|---|
| Cache | 1000 | 1247 | 1641 |
| Existing technical condition | 100% | 63.7% | 54.7% |
| Cache | 1000 | 1540 | 2016 |
| Message management method in this application | 100% | 77% | 67.2% |

It may be seen from Table 2 that, by using the message management method disclosed in this application, when messages are transmitted by a plurality of transmitting terminals simultaneously at intervals of 10 ms, an arrival rate of the messages may be effectively improved, and the loss of the messages in the receiving and transmitting process is reduced.

Figure 7:
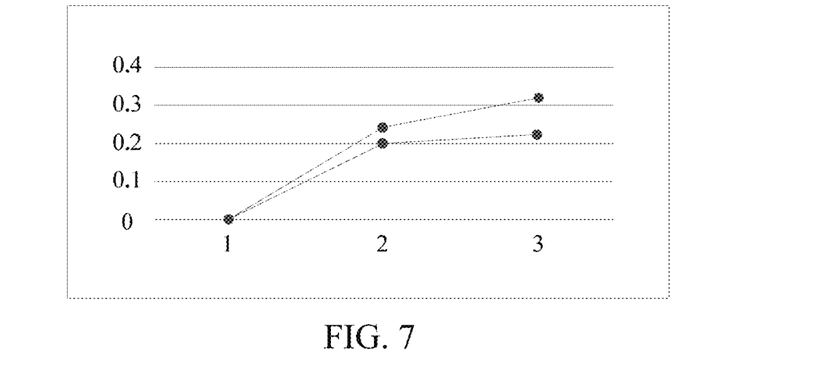
FIG. 7 is a schematic diagram of message loss rates obtained through calculation based on Table 1 and Table 2 when a plurality of transmitting terminals transmit messages at an interval of 10 ms and 20 ms simultaneously according to an embodiment.

FIG. 7 is a schematic diagram of message loss rates obtained through calculation based on Table 1 and Table 2 when messages are transmitted by a plurality of transmitting terminals simultaneously at intervals of 10 ms and 20 ms. As shown in FIG. 7, a solid line represents the message loss rate when messages are transmitted at intervals of 10 ms, and a dotted line represents the message loss rate when messages are transmitted at intervals of 20 ms. As disclosed in this application, the received messages are stored into corresponding cache queues according to the priorities of the received messages; and the messages are extracted from the cache queues, and the extracted messages are stored to a uniform cache queue; the messages in the uniform cache queue are scheduled to a corresponding scheduling queue; and the messages are transmitted to a terminal by using the transmitting channel corresponding to the scheduling queue. In this way, the arrival rate of the messages may be effectively improved, and the loss of the messages in the receiving and transmitting process is reduced.

In this embodiment, under the condition of 200 terminals, 500 terminals, or 1000 terminals, as disclosed in this application, the received messages are stored into corresponding cache queues according to the priorities of the received messages; the messages are extracted from the cache queues, and the extracted messages are stored into a uniform cache queue; and the messages in the uniform cache queue are scheduled to a corresponding scheduling queue. In a process of transmitting requests to the terminal by using the transmitting channel corresponding to the scheduling queue, a result of an average latency of transmission of 1000 urgent messages is shown in FIG. 3, and a unit for the latency of the urgent messages in Table 3 is millisecond (ms).

TABLE 3

| Test occasion | 200 receiving terminals | 500 receiving terminals | 1000 receiving terminals |
|---|---|---|---|
| Existing technical condition | 1013.7 | 2925.1 | 5735.2 |
| Message management method in this application | 668.3 | 1835.4 | 3531.4 |

It may be seen from the disclosure of Table 3 that, by using the message management method disclosed in this application, the latency of the urgent messages with high priorities may be effectively reduced, and a high latency problem of the urgent messages with high priorities caused by the waiting of transmission in the existing technical condition is avoided.

Figure 8:
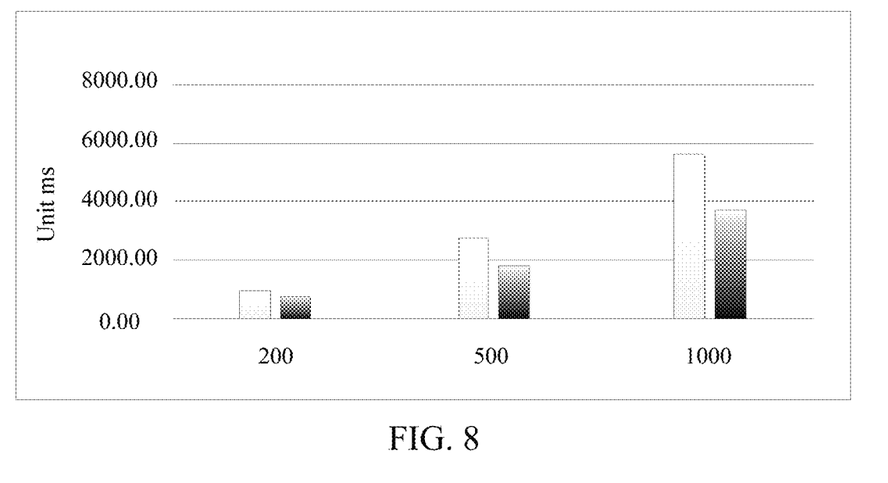
FIG. 8 is a schematic bar chart of latencies of urgent messages in use of the message management method according to an embodiment.

FIG. 8 is a schematic bar chart of latencies of urgent messages in use of the message management method according to an embodiment of this application. As shown in FIG. 8, the solid line bar chart is used for representing a latency time of the urgent messages under the existing technical condition, and the shadow bar chart is used for representing a latency time of the urgent messages under a condition that the message management method in this application is used. As disclosed in this application, the received messages are stored into corresponding cache queues according to the priorities of the messages; the messages are extracted from the cache queues, and the extracted messages are stored into a uniform cache queue; the messages in the uniform cache queue are scheduled to a corresponding scheduling queue; and the messages are transmitted to the terminal by using a transmitting channel corresponding to the scheduling queue. In this way, the latency of the urgent messages with high priorities may be effectively reduced, and a high latency problem of the urgent messages with high priorities caused by the waiting of transmission in the existing technical condition is avoided.

A person skilled in the art may know that the embodiment of this application may be provided as a method, a system, or a computer program product. Therefore, the embodiments of this application may use a form of hardware embodiments, software embodiments, or embodiments combining hardware and software. In addition, the embodiments of this application may adopt one or more forms of computer program products implemented on a computer-usable storage medium (including a magnetic disc memory, an optical memory, and the like) including computer-usable program codes.

The embodiments of this application are described with reference to the flowcharts and/or block diagrams of a method, a device (system), and computer program products of the embodiments of this application. It is to be understood that each process and/or block in the flowcharts and/or block diagrams, and a combination of the processes and/or blocks in the flowchart and/or block diagrams may be implemented by computer program operations. These computer program operations may be provided to a processor of a general-purpose computer, a special purpose computer, an embedded processor, or another programmable data processing device to generate a machine, to make the operations, executed by the processor of a computer or the another programmable data processing device, generate an apparatus to implement specified functions in one or more processes of the flowcharts and/or one or more blocks in the block diagrams.

These computer program operations may alternatively be stored in a computer-readable memory that may guide the computer or the another programmable data processing device to work in a specific manner, to make the operations stored in the computer-readable memory generate a manufacture including an operating device, where the operating device implements specified functions in one or more processes of the flowcharts and/or one or more blocks of the block diagrams.

These computer program operations may alternatively be loaded into the computer or the another programmable data processing device, to make a series of operation steps performed on the computer or the another programmable device to generate processing implemented by the computer, and therefore, the operations performed on the computer or the another programmable device provide steps for implementing specified functions in one or more processes of the flowcharts and/or one or more blocks of the block diagrams.

A person of ordinary skill in the art may understand that all or some of the processes in the method of the foregoing embodiments may be implemented and completed by using the computer programs to instruct related hardware. The programs may be stored in a non-volatile computer-readable storage medium, and the programs, when executed, may include the processes of the foregoing method embodiments. Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only show several implementations of this application and are described in detail, but they are not to be construed as a limit to the patent scope of this application. A person of ordinary skill in the art may make various changes and improvements without departing from the ideas of this application, which shall all fall within the protection scope of this application. Therefore, the protection scope of the patent of this application shall be subject to the appended claims.

What is claimed is:

1. A message management method, executed by a computing device, the method comprising:
    storing received messages into a plurality of cache queues according to priorities of the received messages;
    extracting messages from the plurality of cache queues, and storing the extracted messages into a uniform cache queue, wherein the uniform cache queue includes multiple entries, each entry corresponding to a respective one of the plurality of cache queues;
    scheduling the stored messages in the uniform cache queue to a plurality of outputting scheduling queues according to their respective priorities; and
    transmitting the stored messages from the scheduling queues to respective terminals by using a transmit channel corresponding to the scheduling queues.

2. The method according to claim 1, wherein the plurality of cache queues include a fixed quantity of cache queues, each cache queue configured to receive and store messages having a corresponding priority.

3. The method according to claim 1, wherein the plurality of cache queues include a static quantity of cache queues according to a quantity of priorities associated with initialized messages.

4. The method according to claim 3, wherein there is a positive correlation between the static quantity and the quantity of priorities associated with the initialized messages.

5. The method according to claim 1, wherein the plurality of cache queues are created by:
    obtaining priorities involved in the received messages; and
    creating a dynamic quantity of cache queues according to the priorities involved in the received messages.

6. The method according to claim 5, wherein the creating a dynamic quantity of cache queues according to the priorities involved in the received messages comprises:
    creating cache queues whose quantity corresponds to that of the involved priorities according to the priorities involved in the received messages.

7. The method according to claim 5, wherein the creating a dynamic quantity of cache queues according to the priorities involved in the received messages comprises:
    matching the quantity of the priorities involved in the received messages with a priority quantity threshold, and creating a dynamic quantity of cache queues according to a matching result, at least one cache queue configured to store a message with a fixed priority in the messages being comprised.

8. The method according to claim 7, wherein the creating a dynamic quantity of cache queues according to a matching result comprises:
    in a case that the quantity of the priorities involved in the messages is greater than or equal to the priority quantity threshold, creating a first quantity of cache queues; and
    in a case that the quantity of the priorities involved in the messages is less than the priority quantity threshold, creating a second quantity of cache queues.

9. The method according to claim 1, wherein the extracting messages from the cache queues, and storing the extracted messages into a uniform cache queue comprises:
    in a case that the messages extracted from the cache queues are all scheduled to a corresponding scheduling queue,
    extracting the messages from the cache queues to the uniform cache queue in a polling extraction manner.

10. The method according to claim 9, wherein the extracting the messages from the cache queues to the uniform cache queue in a polling extraction manner comprises:
    sorting the priorities of the cache queues in descending order; and
    extracting, according to a result of the sorting in descending order, the messages from the cache queues to the uniform cache queue through polling extraction.

11. The method according to claim 1, wherein the scheduling the stored messages in the uniform cache queue to a plurality of outputting scheduling queues according to their respective priorities comprises at least one of the following operations:

distributing a message to one of a real-time scheduling queue and a non-real-time scheduling queue according to a priority identifier of the message in the uniform cache queue;

determining a real-time or non-real-time scheduling attribute of the message according to a priority of the message in the uniform cache queue; and scheduling the message to one of the real-time scheduling queue and the non-real-time scheduling queue according to the scheduling attribute of the message.

12. The method according to claim 11, wherein the determining a real-time or non-real-time scheduling attribute of the message according to a priority of the message in the uniform cache queue comprises:

determining the real-time scheduling attribute of the message in a case that the priority of the message in the uniform cache queue is greater than a priority threshold; and determining the non-real-time scheduling attribute of the message in a case that the priority of the message in the uniform cache queue is not greater than the priority threshold.

13. The method according to claim 1, wherein the transmitting the stored messages from the scheduling queues to respective terminals by using a transmit channel corresponding to the scheduling queues comprises at least one of the following operations:

transmitting the stored messages from a scheduling queue by using a reserved channel in a case that the scheduling queue is a real-time scheduling queue, the reserved channel being configured to instantly transmit the messages in the real-time scheduling queue; and transmitting the messages from a scheduling queue by using a common channel sequentially according to their priorities in a case that the scheduling queue is a non-real-time scheduling queue.

14. A computing device, comprising memory and a processor, the memory storing computer-readable instructions, and the computer-readable instructions, when executed by the processor, causing the processor to perform a plurality of operations including:

storing received messages into a plurality of cache queues according to priorities of the received messages;

extracting messages from the plurality of cache queues, and storing the extracted messages into a uniform cache queue, wherein the uniform cache queue includes multiple entries, each entry corresponding to a respective one of the plurality of cache queues;

scheduling the stored messages in the uniform cache queue to a plurality of outputting scheduling queues according to their respective priorities; and transmitting the stored messages from the scheduling queues to respective terminals by using a transmit channel corresponding to the scheduling queues.

15. The computing device according to claim 14, wherein the plurality of cache queues include a fixed quantity of cache queues, each cache queue configured to receive and store messages having a corresponding priority.

16. The computing device according to claim 14, wherein the plurality of cache queues include a static quantity of cache queues according to a quantity of priorities associated with initialized messages.

17. The computing device according to claim 14, wherein the scheduling the stored messages in the uniform cache queue to a plurality of outputting scheduling queues according to their respective priorities comprises at least one of the following operations:

distributing a message to one of a real-time scheduling queue and a non-real-time scheduling queue according to a priority identifier of the message in the uniform cache queue;

determining a real-time or non-real-time scheduling attribute of the message according to a priority of the message in the uniform cache queue; and scheduling the message to one of the real-time scheduling queue and the non-real-time scheduling queue according to the scheduling attribute of the message.

18. A non-transitory computer-readable storage medium storing computer-readable instructions, the computer-readable instructions, when executed by one or more processors, causing the one or more processors to perform a plurality of operations including:

storing received messages into a plurality of cache queues according to priorities of the received messages;

extracting messages from the plurality of cache queues, and storing the extracted messages into a uniform cache queue, wherein the uniform cache queue includes multiple entries, each entry corresponding to a respective one of the plurality of cache queues;

scheduling the stored messages in the uniform cache queue to a plurality of outputting scheduling queues according to their respective priorities; and transmitting the stored messages from the scheduling queues to respective terminals by using a transmit channel corresponding to the scheduling queues.

19. The non-transitory computer-readable storage medium according to claim 18, wherein the scheduling the stored messages in the uniform cache queue to a plurality of outputting scheduling queues according to their respective priorities comprises at least one of the following operations:

distributing a message to one of a real-time scheduling queue and a non-real-time scheduling queue according to a priority identifier of the message in the uniform cache queue;

determining a real-time or non-real-time scheduling attribute of the message according to a priority of the message in the uniform cache queue; and scheduling the message to one of the real-time scheduling queue and the non-real-time scheduling queue according to the scheduling attribute of the message.

20. The non-transitory computer-readable storage medium according to claim 18, wherein the transmitting the stored messages from the scheduling queues to respective terminals by using a transmit channel corresponding to the scheduling queues comprises at least one of the following operations:

transmitting the stored messages from a scheduling queue by using a reserved channel in a case that the scheduling queue is a real-time scheduling queue, the reserved channel being configured to instantly transmit the messages in the real-time scheduling queue; and transmitting the messages from a scheduling queue by using a common channel sequentially according to their priorities in a case that the scheduling queue is a non-real-time scheduling queue.

* * * * *